Jan. 7, 1969  W. L. ROLLER  3,420,371

HEAVY MEDIUM SEPARATOR

Filed April 26, 1965  Sheet 1 of 3

INVENTOR.
WILFERD L. ROLLER

BY John A. Young his ATTORNEY

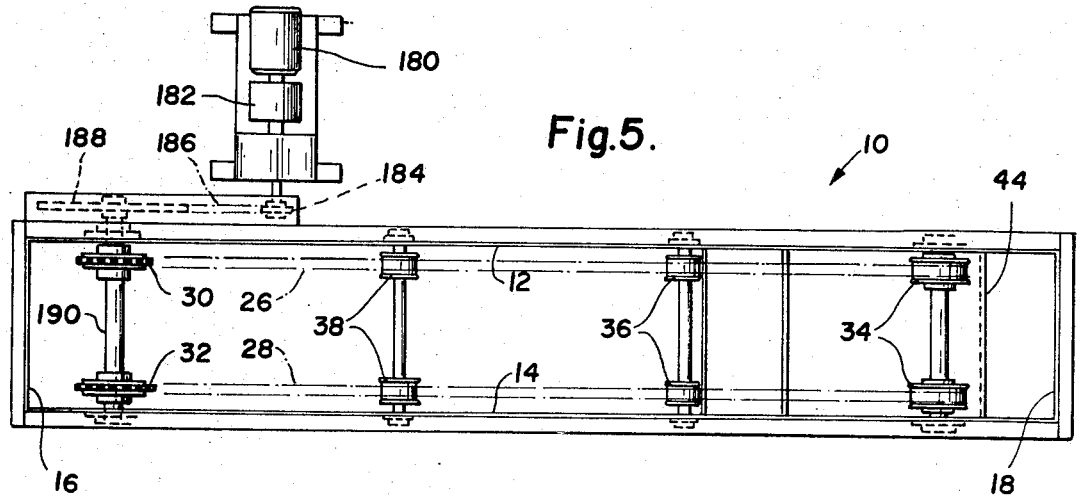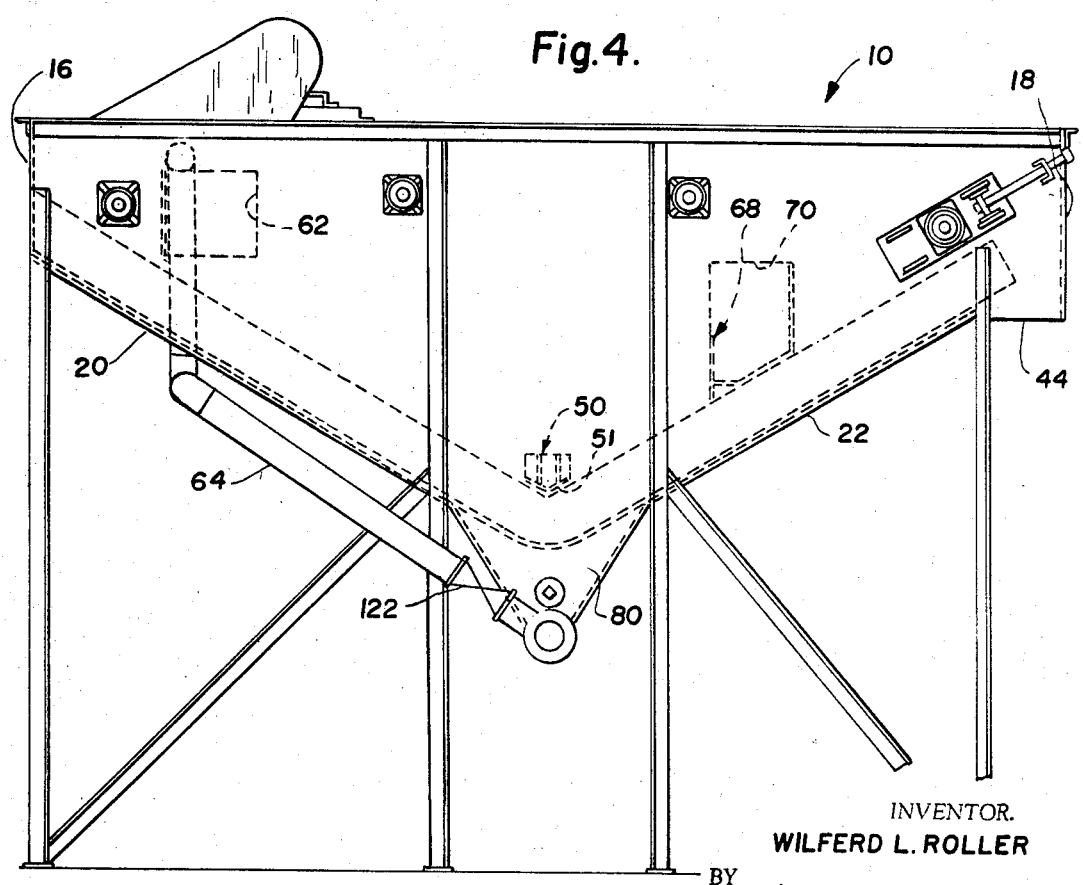

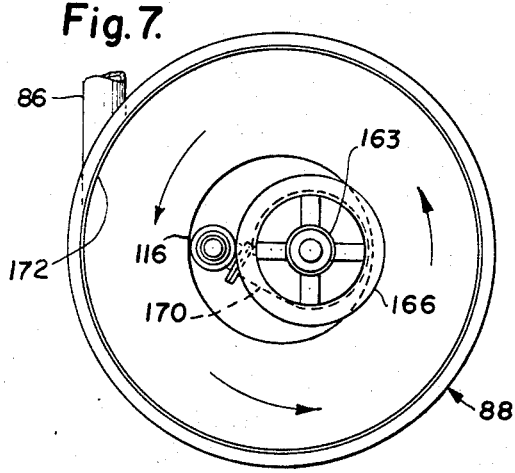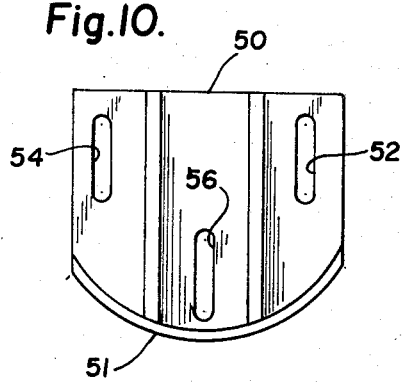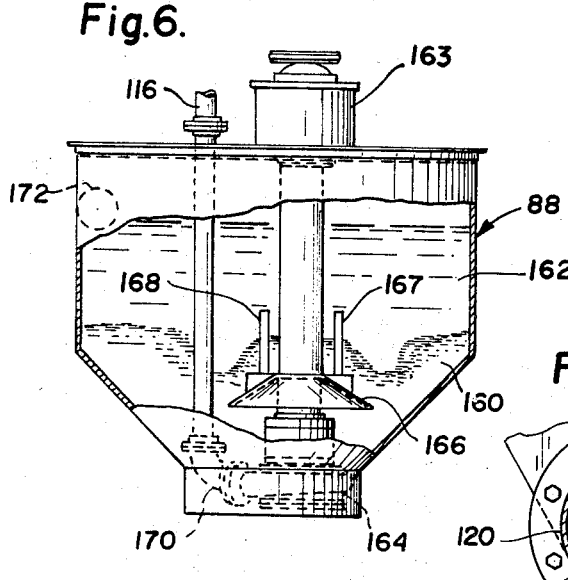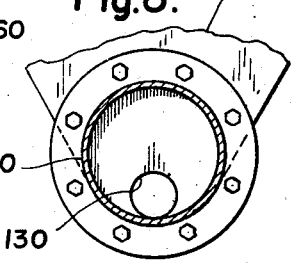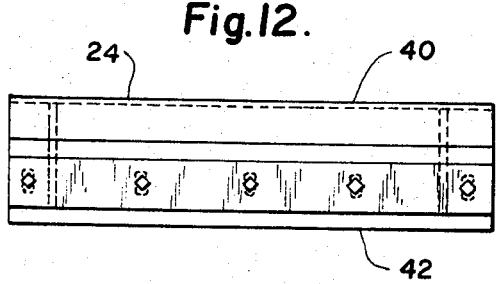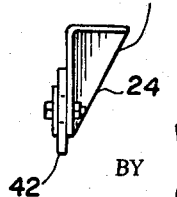

United States Patent Office 3,420,371
Patented Jan. 7, 1969

3,420,371
HEAVY MEDIUM SEPARATOR
Wilferd L. Roller, 3854 Baytree St.,
Pittsburgh, Pa. 15214
Filed Apr. 26, 1965, Ser. No. 450,942
U.S. Cl. 209—172.5        7 Claims
Int. Cl. B03d 1/14

ABSTRACT OF THE DISCLOSURE

Heavy medium type separator has feed and medium inlets adjacents one end of separator, float and sink product outlets adjacent opposite end of separator. The floats outlet is connected to an overflow weir which establishes the level of the pool of medium. The feed inlet discharges particles at a level just above the level of the medium. The flow of all materials are in generally the same direction.

---

This invention relates to a separation apparatus and more particularly to a gravity separation apparatus which utilizes a liquid medium adapted by its specific gravity to effect separation of a raw feed into a flotation fraction and a sink fraction, these two fractions being separated to enable recovery of one or the other as the valuable material.

The present invention has utility for effecting separation of ores, minerals, and the like, and is particularly adapted for separating or washing coal wherein the undesirable rock or gangue is separated from the coal. The invention is also usable, however, in washing gravel, in treatment of ores, and, in short, for effecting any number of gravity separations of materials.

In the present apparatus and method for effecting gravity separations, there is used a flotation medium which is adjusted to provide the necessary specific gravity for effecting the separation and the medium maintains this density substantially without change during operation. A common flotation medium used is a water suspension magnetite. When the raw feed coal, ore, or other material is then fed into the vessel containing the magnetite, there is a flotation-sink separation of the coal and its accompanying rock impurity. It is one of the persistent problems of an apparatus of the class described, that the magnetite will tend to settle within the vessel and is thereby lost to the system. This means that additional magnetite must be added to compensate for the settled or lost magnetite, hence necessitating a much larger apparatus and one which has a larger power requirement. Moreover, the settled quantities of magnetite tend to change the specific gravity of the flotation medium, and because of the nonuniformity in specific gravity of the flotation medium, a separation of the raw feed into its respective components is not carried out as efficiently as possible.

A further shortcoming of the gravity separating apparatus now in use, is that the flotation medium tends to vary in specific gravity of the flotation medium during operation; consequently, a more or less constant monitoring of the specific gravity is required and periodic adjustments are found necessary either by adding additional magnetite or by diluting the concentration to provide a specific gravity dictated by conditions of operation.

In the process of flotation separations, an important step is to recover the flotation medium and return it to the vessel or tub as it is sometimes referred to, for further processes. The various recovery techniques which are involved tend to disturb the specific gravity of the flotation medium, thus impeding efficiency in operation. The presently employed complicated flow systems for the materials further necessitates larger equipment and many other apparatus, impeding its transportability and requiring greater power consumption and larger quantities of media.

Accordingly, one of the principal objects of the present invention is to provide a new and improved separation vessel which eliminates any settling-out spaces whereby the magnetite or other material controlling the specific gravity of the flotation medium, will be prevented from separating from the flotation medium and consequently smaller quantities of the magnetite are usable and the size of the apparatus correspondingly reduced.

A further object of the present invention is to obtain an improved separator vessel by providing that all of the flows of the materials therein are in generally the same direction; thus, the circulating flows of flotation medium, raw feed, sink material, and flotation material all generally progress along approximately the same line of travel within the vessel, and thus more efficiently utilize the volume of the vessel. There is also a reduction in frothing, boiling and eddy currents at the surface of the medium. By simplifying the flow diagram associated with an improved vessel, it is possible to produce a combination of equipment which is of smaller size, more efficiently utilizing the magnetite, and producing more efficient separation by reason of the great uniformity of the specific gravity of the flotation medium throughout the vessel.

Another object of the present invention is to utilize an improved means for withdrawing the sink material, embodying a plurality of spaced resilient flights which are causes to sweep uniformly all of the surfaces of the vessel whereon any sink material tends to collect. In this way, not only is the magnetite maintained in solution, but also there is prevented any internal collection of rock or other sink material within the vessel. Moreover, the present invention embodies a novel guide means for directing the movement of the flight members along the bottom of the vessel, so as to remove all of the debris or other settling ingredients at the sloping bottom surfaces of the vessel.

It is a still further object of the present invention to provide a control parameter wherein the rate of flow of flotation material which serves as the propelling force for the raw feed, is readily adjustable to provide for different kinds of raw feed, i.e., ores, coal, gravel, mineral of various kinds, etc.

A further object of the present invention is to provide an improved sump which receives recirculating flotation medium and which is adapted to serve as a means for re-suspending the magnetite which is settled out when the apparatus is not in use and for restoring the solution to a desired specific gravity for recirculation.

It forms an important part of the present invention that the magnetite or other material which adjusts the specific gravity of the flotation medium, is effectively used to the point that the equipment is reduced both volumetrically and in power requirements, so that the entire apparatus can be more readily transported to inaccessible areas and there be set up and operated with reduced power requirements. The smaller, i.e., shallower vessel avoids compression zones and avoids "teeter zones." Accordingly, the apparatus can be taken to strip mines, for example, in areas which have previously proved to be too difficult terrain for operation, and can be quickly set up and operated for coal washing operations.

It is not unusual in the present invention to use only a fraction of the magnetite requirements of other apparatus to achieve the same rates of separation, and this is reflected in a much reduced size apparatus and one which is more economical to operate.

Other objects and features of the present invention will become apparent from a consideration of the following description, which proceeds with reference to the accompanying drawings, wherein:

FIGURE 4 is an enlarged side elevation view of the separation vessel;

FIGURE 5 is a top view of the vessel illustrated in FIGURE 4;

FIGURE 6 is a side elevation view of the sump which receives the recycling flow of flotation medium;

FIGURE 7 is a top view of the apparatus shown in FIGURE 6;

FIGURES 8 and 9 are enlarged detail views of the manifold baffle;

FIGURES 10 and 11 are front elevation and side views respectively of the shoe at the bottom of the vessel for directing the line of movement of the flights;

FIGURE 12 is a detail view of one of the flights which are used for removing the sink material and which travel endlessly along the bottom of the separation vessel; and, FIGURE 13 is a side view of the flight illustrated in FIGURE 12, viewed from the right-hand side thereof.

Figure 1:
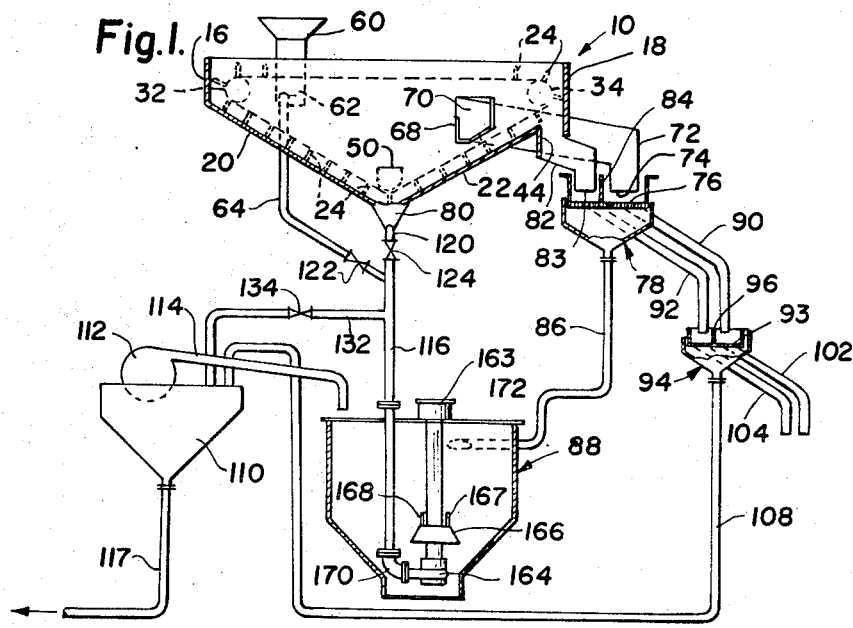
FIGURE 1 is a diagrammatic elevation view of the system apparatus for effecting coal washing operation.

Referring now to the drawings, separation vessel, (FIGURES 2, 4) designated generally by reference numeral 10 has perpendicular straight sides 12 and 14 and the other two sides are provided by perpendicular sections 16 and 18 and inclined base sides 20, 22, which are sloped so that there is a decreasing cross section at the bottom of the vessel. The vessel is so constructed that the only settling out surfaces are on the interior surfaces of inclined sides 20, 22.

Figure 2:
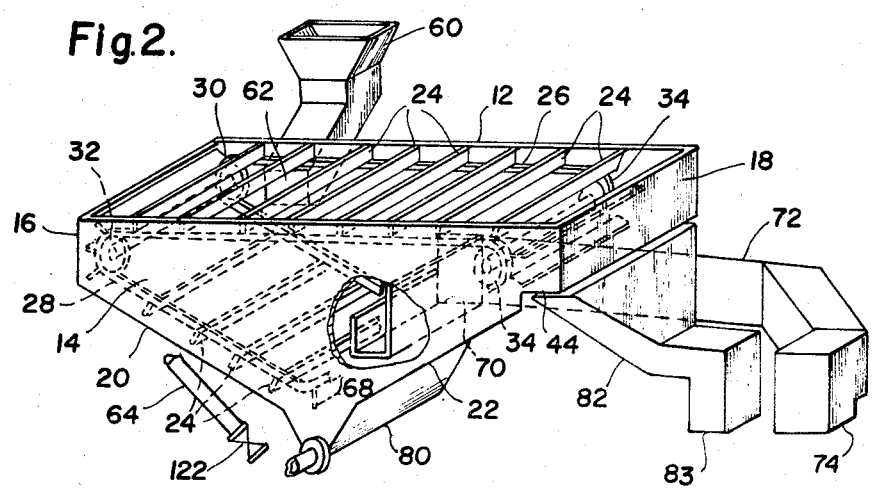
FIGURE 2 is an isometric view of the separation vessel shown in FIGURE 1, a portion of the side walls of the apparatus being broken away to show certain of the interior structure.
Figure 3:
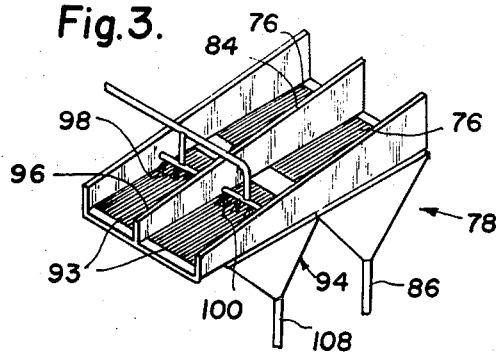
FIGURE 3 is an isometric detail view of the washing apparatus for removing the liquid flotation material from the float and sink ingredients respectively after they are removed from the apparatus in FIGURE 1.

Within the vessel are a plurality of impellers or spaced flights 24 which are carried on and secured to spaced endless chains 26 and 28. The chains are supported at one end of the vessel on a spaced pair of sprocket drive wheels 30, 32, and at the upper end of the vessel on additional spaced pairs of idler wheels 34, 36, and 38 (FIGURE 5). The impellers or flights 24 include angular mounting plates 40 and rubber scraper blades 42 which lightly engage the bottom or interior surfaces of the inclined sides 20, 22, traveling downwardly along side 20 and upwardly along side 22 in order to advance any settled material or sink material to outlet 44 adjacent side 18 (FIGURES 1, 2). The change of direction imparted to the impeller or flight elements is provided by a hold-down shoe 50 having an arcuate guide surface 51 (FIGURE 10). The shoe is vertically adjustable to properly position and tension the chains 26, 28 and flights 24 in relation to the bottom surfaces of the sides 20, 22. The adjustment is obtained by elongated slots 52, 54, 56, which receive support bolts and permit the shoes to move up and down to secure the proper position and the bolts are then tightened holding the shoe against further movement.

The vessel 10 is filled to a preferred level with a liquid flotation medium consisting of an aqueous solution of magnetite, the concentration of the magnetite being used to adjust the specific gravity of the flotation medium in accordance with the material being separated. Thus, where it is coal which is being washed, there is an optimum concentration but this optimum concentration will differ depending upon the specific gravity of the materials being separated the relationship being that the specific gravity of the flotation medium is intermediate the specific gravity of the two materials being separated. Thus, the concentration of the magnetite is adjusted so that the specific gravity of the aqueous solution is greater than that of the coal which floats at the surface and is less than that of the rock which sinks to the bottom of the vessel. The liquid medium fills the vessel, completely covering the sides 20, 22, the flotation medium level is just below the entry point where the inflow feed material enters through a chute 60 having an outlet 62 (FIGURE 2) which discharges the feed into the vessel 10. The liquid medium is constantly recirculated and is reintroduced to the vessel through a line 64 which wets the incoming feed material prior to its immersion within the liquid medium. The raw feed stock does not change the specific gravity of the flotation medium by becoming wetted thereby. The incoming flow of flotation medium creates a current which moves the incoming feed from side 16 toward side 18, the lighter coal floating at the top and the heavier rock settling or sinking to the bottom of the vessel. By the time the feed stock reaches weir 68 there is only coal at the surface and the heavier foreign particles have, in the time interval of traveling from end 16 to the weir 68, all sunk and thereby separated from the floating layer of coal. The coal leaves through outlet 70 and duct 72, the duct being inclined in a downward direction to facilitate the flow of coal which is discharged from a discharge opening 74 onto a screen 76 which is at the upper end of a collector hopper 78. The spaced flights 24 continuously pass over the interior surface of side 20, engaging the side 20 to advance all of the settled or "sink" materials, urging them first toward the bottom or base 80 then advancing such materials in an upward direction along the side 26, receiving the change in direction by shoe 50. The sink material is swept through outlet 44 and into chute 82 which is inclined downwardly to discharge the material through discharge opening 83 onto the screen 76, the sink material being separated from the coal by means of a partition 84. On the screen 76 there is drained from the float and sink materials respectively any of the liquid phase flotation medium and this material is collected in a collector 78 and is returned through line 86 to a sump 88. All of the drained off flotation medium from 78 is of the same concentration as the flotation medium in the vessel 10, therefore, withdrawal of material does not change the concentration or specific gravity of the flotation medium.

Within the vessel 10 there is no opportunity for any of the magnetite to settle out and collect in any quantity, nor is there any opportunity for any of the rock or sink material to settle out and remain within the vessel 10. The reason why the vessel 10 is free of settling out or "dead" spaces is that the impellers or flights 24 extend across the entire width of the vessel 10 (FIGURE 5) and they traverse over the entire length of the sloping sides 20, 22, and therefore there are no dead spaces at any of the cross sectional areas of the vessel. That is, settling of magnetite and sink material can occur only on the interior surfaces of the inclined sides 20, 22, and all portions of this are swept by the flights 24, hence, no accumulations of these materials can occur in vessel 10. Consequently, there are no dead spaces where magnetite can settle out and as a further consequence the specific gravity of the flotation medium remains constant. Since there is no "hideout" areas for the magnetite, all of the magnetite is effectively used and this means a total reduction in the amount of magnetite which is necessary, and hence the volumetric capacity of the apparatus can be used more efficiently for a given coal washing capacity and the vessels can be correspondingly made of much smaller size and impose smaller water demands and power demands for operation. Because the equipment is smaller and more efficient, it can be more readily transported and used in inaccessible spaces which are frequently encountered in strip mine operations, gravel pits, and the like, and where water is relatively scarce, the apparatus can be used more efficiently with the available water supply.

After the coal (flotation material) and rock (sink material) have drained of flotation medium, they are transported from screen 76 through chutes 90 and 92 respectively to a second screen 93 which has a barrier 96 separating the two materials and here the two materials are washed with sprays 98 and 100 of water to remove the last vestiges of the magnetite and after being washed and completely stripped of magnetite, the coal and rock are discharged; the coal is fed through opening 102 into a truck, bin or the like (not shown), and the rock or other refuse is discharged through line 104. The dilute magnetite solution is discharged from collector 94 through line 108 to a concentrating tank 110 where a magnet 112 concentrates the medium and returns it through line 114 by gravity to the sump 88.

After the magnetite is stripped from the solution, the remaining slurry is discharged through line 117 (FIGURE 1).

The sump 88 returns the medium, adjusted to be at the desired specific gravity, to the vessel 10 through line 116 having branch lines 64 and 120 each with a valve 122 and 124 to determine what proportion of the returning medium is introduced to the vessel with the incoming flow of raw coal or other feed through chute 60 and what proportion is introduced at the base 80 of the vessel 10. Where it is desired to traverse the vessel at a fairly rapid rate, then a greater proportion of the total flow from line 116 is introduced to the vessel by way of line 64 and conversely, where the settling time should be greater, the time to traverse the vessel from inflow to weir 68 should be correspondingly increased and therefore more of the medium is introduced at the base or bottom 80 of the vessel 10 by way of line 120. This adjustment in proportion of flows is provided by means of a manifold 130 (FIGURE 8) which by its settling determines the proportion of fluid which flows upwardly through the vessel 10 through its inlet opening.

In order to control the specific gravity of the flotation medium, a part of the flow from the sump 88 through line 116 can be diverted through line 132 and returned to the magnetic separator 110 in accordance with the setting of the bleed valve 134. This is the only control that is required for controlling the specific gravity of the system.

When the system is not in use, all of the liquid flotation medium is drained into the sump 88 and the liquid and solid phases of the medium quickly separate into a settled out layer of magnetite 160 and a supernatant aqueous layer 162 (FIGURE 6). In order for the system to operate satisfactorily, it is required, of course, that the medium be of uniform concentration and specific gravity throughout and it is one of the important features of the present invention that the system once it is started up will automatically, immediately, re-suspend all of the magnetite and the liquid flotation medium will be returned to its proper specific gravity.

Referring to FIGURE 6, when the system is first started to operate, the motor 163 will operate a pump 164 at the base of the sump, the pump being protected by a shield 166 from the settled out layers of magnetite. As shown in FIGURE 1 and FIGURE 6, the shield 166 does not prevent magnetite from settling at the bottom of the sump 88 but, as indicated in the drawing, it does prevent the magnetite from settling as a concentrated mass over the suction of the pump 164 at the base of the sump, and for that reason the pump can start easily. The suction hood or shield is fully described in issued patent, No. 3,046,059, issued July 24, 1962. The hood or shield prevents any effectively significant amount of the magnetite from entering into the pump and clogging its operation. A number of lines or conduits 167, 168, project upwardly through the settled out magnetite and into the liquid layer providing access of liquid (water) to the pump 164 permitting the pump 164, upon actuation by the motor 163 to cause circulation of water through line 170 connecting with line 116 to circulate through the vessel 10, and the circulating water will return through line 86 to the vessel, entering the sump through an opening 172. The opening 172 can be located at, or just below, the level of the settled out magnetite and as the incoming water from inlet 172 enters the sump, it will, by virtue of its swirling action, agitate the magnetite and cause a part of it to become suspended till eventually the recirculating medium will re-suspend all of the magnetite in the settled out layer 160 and the circulating medium will become uniformly of the same specific gravity after the magnetite layer is completely re-suspended, and is maintained at that specific gravity.

The concentration of flotation medium is maintained because of the nonoccurrence of settling out within the vessel 10 and because the medium which is removed is always at the same concentration as the medium within the vessel and is restored to that concentration before being returned to the vessel by the sump through line 86. None of the magnetite is lost to the system, that which is diluted in the wash water, is concentrated at the magnetic separator before it is returned to the sump.

In the operation of the sump, the recirculating water is vortexed; i.e., it swirls around the periphery of the sump and in this manner, causes the re-suspension of magnetite. The magnetite is not mixed with air because of the swirling or vortexing of the liquid which is caused to circulate around the inner-periphery of the sump. The hood which overlies the pump has an angularity which prevents the settled out magnetite from entering the underlying pump. The pump does have available to it, however, the supernatant liquid from the pipes 167, 168, which provide accessible fluid for the pump which recirculates the supernatant liquid and eventually all of the magnetite is re-suspended. It is an important feature of the sump that the pump is submerged and by merely operating the pump, it is possible to re-suspend all of the magnetite. The angularity of the hood which is found to yield the best results is one of about 30 degrees. The side walls of the sump are at approximately 45 degrees, which is the necessary inclination for supporting the settled out magnetite while at the same time preventing the magnetite from fouling the pump. The hood has an inclination of approximately 30 degrees to shield the pump from the overlying magnetite.

It is only a matter of 10 minutes or so that the pump 162 of the sump must operate before all of the magnetite is re-suspended and the flotation medium is of the desired uniform specific gravity to resume operation.

The total quantity of liquid which is circulated and which is required in the vessel is quite small because the volumetric requirements of the vessel 10 are small; hence, the vessel can be of relatively light, unreinforced structure, again, making it more readily transportable.

*Operation*

In operation, the flow of medium, the flow of the feed stock, the direction of flow of the impellers or flights, the outflow of coal and the outflow of sink material are all in the same relative direction, and because of this, there are minimized eddy currents and boiling at the surface of the vessel. This is an important advantage because separation operations are made more efficient and there is less magnetite loss to the system.

In operation, the system to be described necessitates, in order to produce a hundred tons per hour of fully washed coal, only five tons of raw magnetite, and this should be compared with prior art devices which necessitate, in the production of a same rate of washed coal, up to 15–20 tons of raw magnetite. Thus, the raw magnetite requirements are only from one third to one fourth that of prior devices and the greater efficiency and use of the magnetite is attributed to the fact that there is substantially eliminated any settling out or hideout areas for the magnetite in the system. Also as a result, correspondingly less liquid medium and hence less flotation medium is required, and the vessels are made smaller, more compact, lighter, and hence more transportable, and better adapted for set up in the field.

Also, the screens which will be described in conjunction with the process are sluice screens and not vibrating screens and the screens are adjustable to different degree slopes, made to whatever slope is best adapted for the particular materials being separated. With these advantages in mind, the process of coal washing will next be described in detail, it being understood that various operations can be employed with the described process and apparatus, including washing of gravel, separation of ores, etc., and the processes apply in which either the flotation material or the sink materials or both can be the valuable ingredient intended for recovery.

In operation, the motor 163 is started, causing the circulation of water in layer 162, the water being discharged in the outlet of the pump 164, operated by motor 163, since there are pipes 167, 168, which project upwardly through the protective hood 166 and into the layer of supernatant liquid 162. The circulating water which is discharged from the pump 164 and line 170 into line 116 circulates through the vessel 10 and then back through collector 78 and line 86; this circulation continues until the water from inlet port 172 which swirls over the settled out magnetite layer 160 (FIGURE 6) effects a re-suspension of all of the magnetite within the circulating liquid medium. The liquid medium is quickly brought to its operative specific gravity with all of the magnetite suspended. Nothing is required to re-suspend the magnetite, except to start the motor 163 and within a matter of several minutes, all of the magnetite will be redispersed and re-suspended and the liquid flotation medium will be of the desired specific gravity throughout. After the liquid medium is at the desired specific gravity, any adjustments in the specific gravity being obtained by adjustment of the valve 134, the desired proportion of the medium is introduced into the bottom of the vessel through opening 80 and manifold 130, a quantity of pre-wet raw feed material is fed into the vessel 10 together with the medium of line 64. The raw feed then starts to traverse through the vessel from side 16 toward side 18 and it carries with it a floating layer of coal and the heavier debris, rock, gangue, slate, etc., settles out and comes to rest on one or the other of the interior surfaces of sides 20, 22. The coal is caused to flow with the medium in the direction of the weir 68, the lighter coal is diverted by the weir 68 and out through the opening 70 into the downwardly inclined chute 72 and discharges through opening 74 onto the coal drainage sluice screen 76 which has a partition 84 and the other portion of the sluice screen is adapted to receive the sink material. A motor 180 operating through a clutch 182 drives a gear wheel 184 having a chain drive connection 186 with a sprocket wheel 188 which rotates the shaft 190, the sprocket wheels 30, 32, to endlessly drive the chain pair 26 and 28 having spaced thereon a plurality of impellers of flights 24. The impellers have rubber blades 42 which sweep over the bottom of the vessel, engaging the interior surfaces of the inclined sides, advancing the sink material and directing said sink material downwardly along side 20 and upwardly along side 22, the change of direction of the flights being effected by the arcuate surface 51 of the shoe 50. The shoe 50 is held by a number of bolts received through oblong openings 52, 54, and 56, (FIG. 10), which enable the shoe 50 to be adjusted upwardly or downwardly to obtain the desired tension in the chains and flights. The sink material which is made up of rock, gangue, slate, etc., is discharged through opening 44 and into the inclined duct 82 and discharges through opening 83 onto the nonvibrating sluice screen 76, being separated from the washed coal by the partition 84. The flights remove a quantity of the liquid medium each time an increment of sink material is discharged to the opening 83 and such liquid medium together with any liquid medium leaving the vessel through the opening 70 (FIGURE 2) is drained and is returned to the vessel by way of line 86 which is connected to the sump 88 and is returned by the sump to the vessel. Before discharging the debris and coal, the coal and debris are first transported through ducts 90, 92, to a second screen 93, having a partition 96 and then the two materials are washed and the dilute magnetite is transported through line 108 to a magnetic separator 110 and the magnetite-free clean coal is discharged through line 102 into a truck or a suitable storage means and the magnetite-free rubbish is discharged from line 104 and discarded.

At the magnetic separator 110, the magnetite is removed and the stripped solution is then discharged through line 117.

The concentration of the magnetite within the liquid medium is controlled by means of a valve 134 leading from discharge line 11 of the sump 88 (FIGURE 1) through line 132 reconnecting with the magnetic separator.

As previously described, any desired proportion of medium can be reintroduced to the vessel 10, either at the bottom of the vessel, or with the incoming flow of feed material, depending upon the characteristics of the feed material.

The straight sides of the vessel 10, together with the fact that the entire settling area is swept by the flights, insures that no magnetite is left to settle out within the vessel and remain there, nor is it possible to have any buildup of debris of any kind within the vessel. This more efficient utilization of the magnetite reduces the total quantity of magnetite and proportionately reduces the volumetric requirements for the vessel 10 to maintain a given washing capacity for the coal; thus, the height, width, and length of the vessel can be reduced, all of this contributing to a greater transportability, ease of set up time in operation, reduced power requirements, reduced requirements for raw ingredient, and reduced possibility of pollution problems connected with the discharge of materials from the system. The collinear or substantially collinear travel of the materials through the vessel also produces less agitation, frothing, and hence loss of materials to the system, and the collinear discharge of coal and sink materials (FIGURE 2) also makes for greater compactness of the apparatus.

Although the present invention has been illustrated and described in connection with a single example embodiment, it will be understood that this is illustrative of the invention and it is by no means restrictive thereof. It is reasonably to be expected that those skilled in the art can make numerous revisions and adaptations of the invention to suit individual design requirements, and it is intended that such revisions and adaptations will be included within the scope of the following claims as equivalents of the invention.

What is claimed is:

1. A gravity separation apparatus comprising a vessel having straight sides and inwardly converging entry and exit sides which slope together to form a vessel of reduced cross-section at the base thereof, means adjacent said entry side for feeding a feed material to said vessel at a predetermined level for separation into distinct components, means for supplying a liquid medium which produces a flotation separation of said feed material introduced at the entry end of said vessel, flotation supply means adjacent said entry side for directing a continuous inflow of liquid flotation medium across the surface of said flotation medium therein to effect a movement of the feed material in the same direction as the inflow of said liquid flotation medium, a combination weir means adjacent said exit side for establishing a body of flotation medium having a defined surface within said vessel and forming an outlet for receiving the float material in the same direction as said flow of feed material, means for withdrawing sink material from the base of said vessel by pushing it along said base in the same direction as the flow of said feed material whereby all of the flows of materials in said vessel are substantially in the same direction from one side of vessel to the opposite side thereof and the flow of float material is due solely to the flow of said medium.

2. The gravity separation apparatus in accordance with claim 1 including said sink material withdrawing means continuously traveling means for removing the sink components of said feed material from the bottom of said vessel including spaced impeller means which advance the sink materials collected on the lower surfaces of said vessel, and a fixed change-direction means in slidable engagement with said continuous traveling means at the bottom of said vessel whereby the spaced impeller means and carrying means are directed from a downwardly traveling direction along one side of the vessel to an upwardly traveling direction on the opposite side of the vessel.

3. The separation apparatus in accordance with claim 1 including sinks material outlet means wherein the sink materials and flotation material are removed in substantially continuous flows from the vessel.

4. The gravity separation apparatus in accordance with claim 1 wherein the apparatus includes a screen having separated portions which drain medium from said flotation and sink portions respectively.

5. The gravity separation apparatus in accordance with claim 4 including a pump for receiving the liquid flotation medium as it is drained from said float and sink components, and a means for returning said flotation medium to said vessel.

6. The gravity separation apparatus in accordance with claim 5 including means for receiving the drained float and sink components and for effecting washing thereof, and means for receiving the washed medium and thereafter concentrating the flotation medium to a desired amount and for return thereof to said vessel.

7. A sump adapted for use in combination with a flotation separation apparatus, comprising a vessel having a conical base therein of diminishing cross-section from upper to lower portions thereof and adapted to receive for recirculation a flotation medium therein, a pump having an inlet at the lower end of said vessel, conical shielding means for preventing the settling of solid phase material from said medium over the inlet of the pump, vertically extending means projecting through said conical shielding means above the level of settled ingredients in said flotation material to provide a flow through such settled solid phase material and providing access for the inlet of the pump to liquid phase material within said vessel, and means for recirculating said liquid phase to effect as it circulates a suspension of solid phase materials therein, whereby all of the settled material is resuspended within the flow circulated throughout the separating apparatus.

References Cited
UNITED STATES PATENTS

| | | | |
|---|---|---|---|
| 2,209,618 | 7/1940 | Vogel | 209—156 |
| 2,486,682 | 11/1949 | Ridley | 209—173 |
| 2,489,661 | 11/1949 | Munro | 209—414 |
| 2,517,743 | 8/1950 | Vogel | 259—96 |
| 2,690,261 | 9/1954 | Maust | 209—172.5 |
| 2,954,870 | 10/1960 | Pagnotti | 209—172.5 |

FRANK W. LUTTER, *Primary Examiner.*

U.S. Cl. X.R.

259—96